US012797655B2

(12) United States Patent
Goodman

(10) Patent No.: US 12,797,655 B2
(45) Date of Patent: Nov. 17, 2026

(54) BATTERY COLLECTION AND TRANSPORT SYSTEM WITH AUTOMATED FIRE SUPPRESSION

(71) Applicant: Redwood Materials, Inc., Carson City, NV (US)

(72) Inventor: Jacob Daniel Goodman, Laguna Niguel, CA (US)

(73) Assignee: Redwood Materials, Inc., Carson City, NV (US)

(*) Notice: Subject to any disclaimer, the term of this patent is extended or adjusted under 35 U.S.C. 154(b) by 171 days.

(21) Appl. No.: 18/809,874

(22) Filed: Aug. 20, 2024

(65) Prior Publication Data

US 2025/0065162 A1 Feb. 27, 2025

Related U.S. Application Data

(60) Provisional application No. 63/578,297, filed on Aug. 23, 2023.

(51) Int. Cl.

| | |
|---|---|
| ***A62C 3/00*** | (2006.01) |
| ***A62D 1/00*** | (2006.01) |
| ***A62D 1/02*** | (2006.01) |
| ***B65F 1/14*** | (2006.01) |

(52) U.S. Cl.

CPC ............ *A62C 3/002* (2013.01); *A62D 1/0064* (2013.01); *A62D 1/0071* (2013.01); *B65F 1/14* (2013.01); *B65F 2001/1494* (2013.01); *B65F 2210/181* (2013.01); *B65F 2240/108* (2013.01)

(58) Field of Classification Search

CPC ........ A62C 3/002; A62C 3/16; A62D 1/0064; A62D 1/0071; B65F 1/14; B65F 2001/1494; B65F 2210/181; B65F 2240/108

USPC .............. 169/26, 54, 62, 70; 220/88.1, 88.2; 429/72, 100

See application file for complete search history.

(56) References Cited

U.S. PATENT DOCUMENTS

| | | | | |
|---|---|---|---|---|
| 8,544,670 | B2 * | 10/2013 | Brilmyer ............... | H01M 50/24 220/88.1 |
| 2018/0241017 | A1 | 8/2018 | Nakamura et al. | |
| 2018/0353784 | A1 * | 12/2018 | Hariram ................ | H01M 50/24 |

(Continued)

FOREIGN PATENT DOCUMENTS

| | | | |
|---|---|---|---|
| CN | 208608249 | U | 3/2019 |

OTHER PUBLICATIONS

International Search Report and Written Opinion as received in PCT/US2024/043491 dated Dec. 12, 2014.

*Primary Examiner* — Steven J Ganey
(74) *Attorney, Agent, or Firm* — Keller Preece PLLC

(57) ABSTRACT

The present disclosure relates to systems and methods for collecting batteries and other devices for disposal or recycling and suppressing fires during storage and/or transportation. In particular, in one or more embodiments, the disclosed systems provide a battery collection and fire suppression system comprising a battery collection bin with side vents in one or more sides of the battery collection bin. Also, in some embodiments, disclosed systems may include modular inserts configured to be inserted into the battery collection bin. Further, in some implementations, the disclosed systems may include fire suppressant configured to be inserted into the battery collection bin about the modular inserts that automatically is deployed during a thermal event.

20 Claims, 9 Drawing Sheets

(56) References Cited

U.S. PATENT DOCUMENTS

| | | | |
|---|---|---|---|
| 2019/0137037 | A1 | 5/2019 | Gehlhausen et al. |
| 2019/0314658 | A1 | 10/2019 | Vandemark et al. |
| 2020/0295326 | A1 | 9/2020 | Qiao et al. |
| 2023/0227297 | A1 | 7/2023 | Fujiki |
| 2023/0253646 | A1 | 8/2023 | Tushar et al. |

* cited by examiner

BATTERY COLLECTION AND TRANSPORT SYSTEM WITH AUTOMATED FIRE SUPPRESSION

CROSS-REFERENCE TO RELATED APPLICATIONS

This application claims priority to and the benefit of U.S. Provisional Patent Application No. 63/578,297, filed on Aug. 23, 2023, which is incorporated herein by reference in its entirety.

BACKGROUND

Recent years have seen a significant increase in the implementation of various types of batteries as an alternative to fossil fuels and other sources of energy. Moreover, the recent surge in popularity of electric vehicles and other electronic devices containing batteries has resulted in a significant increase in demand for battery production, as well as an increased demand for safe and efficient recycling or disposal of batteries and battery materials.

Despite advances in battery production and implementation in various fields of use, existing methods for mass collection, recycling and/or disposal of batteries and battery materials face several shortcomings. For example, conventional systems can safely recycle or dispose of batteries of particular chemical compositions, contained energies, or form factors, such as but not limited to various types of lithium-ion batteries. However, certain compositions of batteries or devices are unstable and unsafe when improperly handled. Accordingly, conventional methods for collecting batteries or devices from users require a trained handler to receive and personally prepare each battery or device for safe transportation to a recycling facility. For example, conventional methods require the trained handler to tape the terminals of each battery and place each battery or device in a separate bag or container. Moreover, additional safety measures are generally required to ensure immediate response in case of a thermal event caused by disposed batteries or devices.

Accordingly, batteries and devices of varying classifications must be processed, stored, and shipped with a high level of care. Unfortunately, conventional methods of receiving and preparing batteries and devices for disposal or recycling generally require attention from a trained handler and extensive cautionary processing, resulting in an inefficient and often inconvenient process.

These along with additional problems and issues exist with regard to conventional systems for collecting batteries and devices.

BRIEF SUMMARY

Embodiments of the present disclosure provide benefits and/or solve one or more of the foregoing or other problems in the art with systems and methods for safely receiving, storing, and transporting batteries for disposal or recycling. Furthermore, the disclosed systems also include mechanisms for suppressing fires during storage and/or transportation. In particular, the disclosed systems provide a battery collection bin where users may safely deposit batteries, without assistance from a trained associate, by placing one or more batteries or devices into a modular insert of the battery collection bin. In some embodiments, the modular inserts are configured to be inserted and held in place within the battery collection bin to provide space between the modular inserts. Further, the modular inserts allow a user to configure a battery collection bin to hold different batteries or combinations of different batteries as needed. Additionally, in some implementations, the disclosed systems include fire suppressant, for example in the form of fire suppressant materials, that occupy the space about the modular inserts within the battery collection bin. Further, in one or more embodiments, the fire suppressant of the disclosed systems can automatically deploy to a targeted location within the battery collection bin in response to a thermal event. Moreover, while maintaining such convenience of operation, the disclosed systems ensure safe receipt, storage, and handling of deposited batteries by providing, for example, focused and automated deployment of fire suppressant over the deposited batteries or devices during thermal events.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1A:
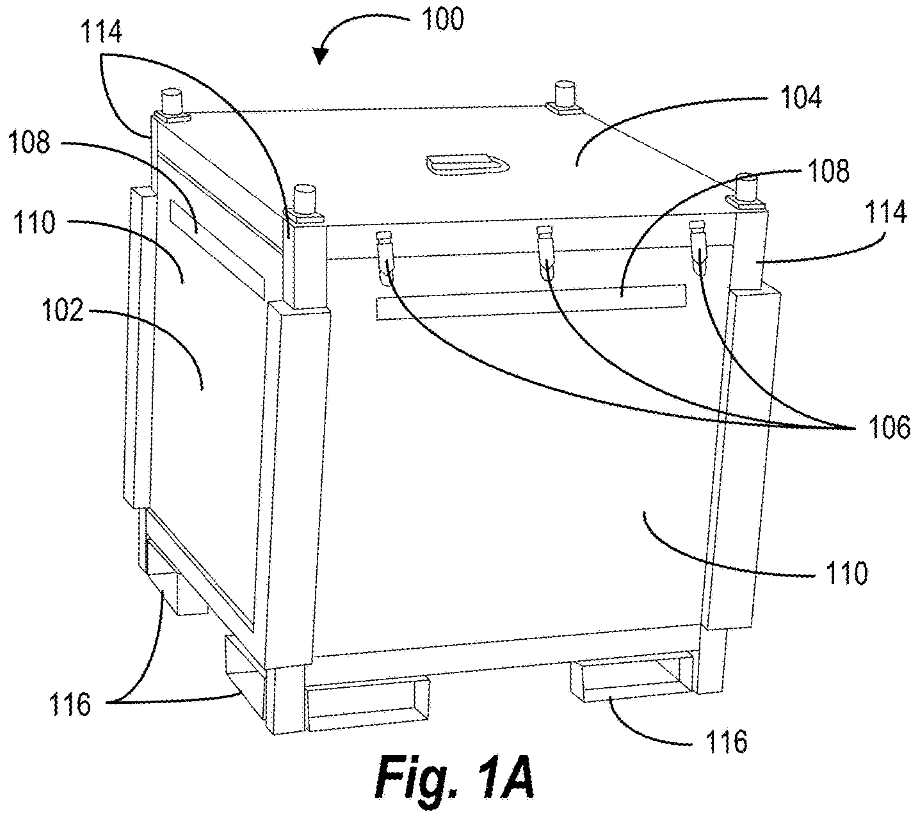
FIG. 1A illustrates a battery collection bin of a battery collection and fire suppression system in accordance with one or more embodiments.

This disclosure describes one or more embodiments of a battery collection and fire suppression system that provides a battery collection bin where users can safely deposit, without assistance from a trained associate or handler, batteries and related devices for disposal or recycling. For example, in some implementations, the battery collection and fire suppression system utilizes a battery collection bin to receive individual batteries and devices from users into modular inserts within the battery collection bin.

In one or more implementations, the battery collection bin of the battery collection and fire suppression system can include guides to position and hold in place the modular inserts within an inner cavity of the battery collection bin. Furthermore, in some embodiments, the battery collection bin can include outer walls separated from inner walls by an inter-wall void holding a gas filtering material. Additionally, in these or other embodiments, the inner walls can include inner wall vents for venting gases from the inner cavity of the battery collection bin into the inter-wall void, through the filtering material within the inter-wall void, and out outer wall vents in the outer walls during a thermal event.

Further, in some embodiments, the battery collection and fire suppression system utilizes a fire suppressant in combination with modular inserts to direct heat during thermal events resulting in focused deployment of the fire suppressant over the deposited battery to suppress and prevent thermal events. For example, in some implementations, the battery collection and fire suppression system utilizes modular inserts with a top opening and side openings that direct heat and flames from a battery undergoing a thermal event toward the fire suppressant. Further, in these or other embodiments, the battery collection and fire suppression system automatically deploys the fire suppressant to a target area within the inner cavity of the battery collection bin (e.g., over the battery undergoing a thermal event) in response to the thermal event.

Moreover, in one or more embodiments, the battery collection and fire suppression system includes fire suppressant in the form of one or more fire suppressant pillows. In these or other embodiments, the fire suppressant pillows include fire suppressant enclosed within a shroud. Moreover, the shroud of a fire suppressant pillow can selectively burn or melt in response to heat and flames of a thermal event to deploy the fire suppressant within the shroud to a targeted location. Furthermore, in one or more implementations, the fire suppressant pillow can include a high moisture sub-compartment including water and fire suppressant (e.g., a foam glass and silica gel mixture). In these or other embodiments, the sub-compartment ruptures in response to a thermal event and deploys the fire suppressant which in turn releases water (e.g., from the silica gel) to cool the inner compartment and or batteries therein and aid in suppressing the thermal event.

As illustrated by the foregoing discussion, the present disclosure utilizes a variety of terms to describe features and advantages of the disclosed systems. Additional detail is now provided regarding the meaning of such terms. For example, as used herein, the term "battery collection bin" refers to a receptacle for storing batteries and other potentially hazardous materials. In one or more embodiments, the battery collection bin includes durable and fireproof materials such as metals, etc. Additionally, the term "fire suppressant" refers to a material utilized for prevention of fires related to volatile materials, such as metals, combustible liquids, or lithium-ion batteries. For example, in some implementations, a fire suppressant can include a mineral-based extinguishing agent, such as Vermiculite, Perlite, Expanded Clay, Expanded Polystyrene (EPS), foam glass, a silica gel, fire resistant or insulating fibers and papers, and other fire, heat, and/or smoke suppressant compounds or a combination thereof. To illustrate, in some embodiments, the fire suppressant can include a foam glass and silica gel mixture. Relatedly, as used herein, the term "silica gel" refers to silicon dioxide in the form of a gel or beads. Silica gel can include a charged silica gel wherein the silica gel is treated or impregnated with one or more fire-retardant substances (e.g., water). Further, a fully charged silica gel includes the silica gel impregnated to full capacity or near full capacity with the fire-retardant substances.

Additionally, as used herein, the term "filtering material" refers to a material that filters harmful substances. In particular, the filtering material can include material that filters one or more of gases, fumes, smoke, particulates, etc. (collectively referred to herein as "gases") produced by batteries undergoing a thermal event. In some implementations, the filtering material includes the same material as the fire suppressant.

As used herein, the term "thermal event" refers to a fire, explosion, release of toxic fumes, etc. Causes of a thermal event can include physical damage to one or more batteries, extreme environmental conditions, improper battery handling, etc.

Figure 1B:
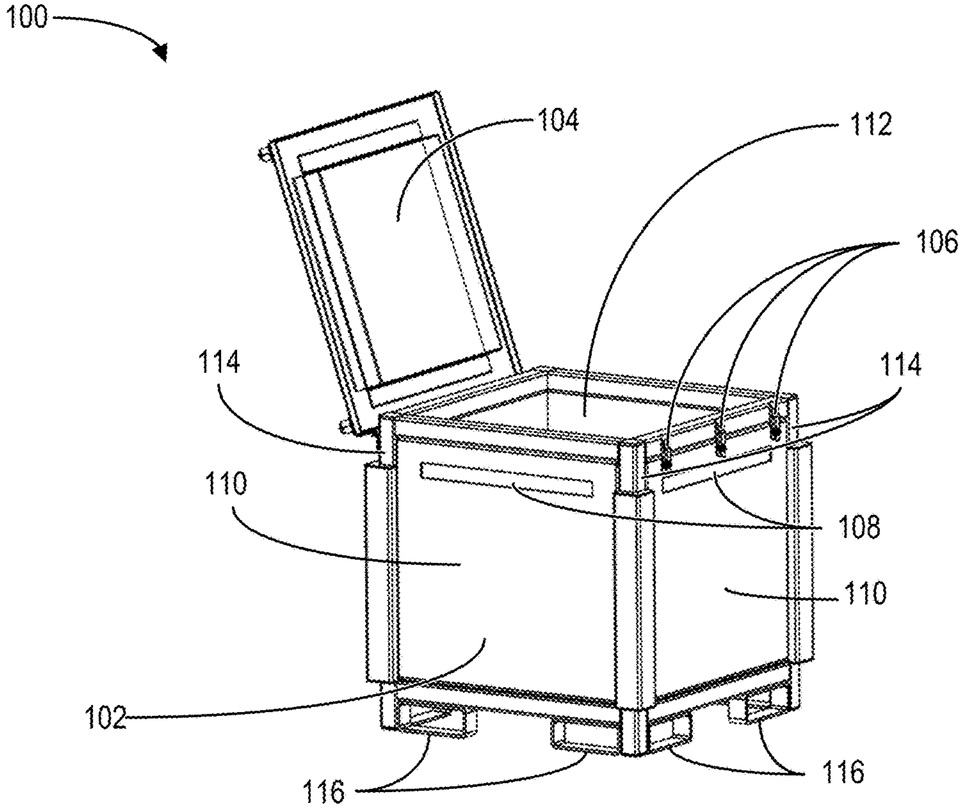
FIG. 1B illustrates a battery collection bin of a battery collection and fire suppression system in accordance with one or more embodiments.

Additional detail will now be provided in relation to illustrative figures portraying example embodiments and implementations of the disclosed methods, apparatuses, and systems. For instance, FIGS. 1A and 1B illustrate a battery collection bin of the battery collection and fire suppression system 100 in accordance with one or more embodiments. Specifically, FIGS. 1A and 1B illustrate a perspective view of the battery collection and fire suppression system 100 showing the outer component of the battery collection and fire suppression system 100 for illustrative purposes. The outer component of the battery collection and fire suppression system 100 includes a battery collection bin 102. In addition to the battery collection bin 102, the battery collection and fire suppression system 100 can include modular inserts and fire suppressant.

The battery collection bin 102 of the battery collection and fire suppression system 100 can vary in dimensions to accommodate a variety of battery sizes, quantities, and battery storage configurations. For example, in one or more embodiments, the battery collection and fire suppression system 100 includes the battery collection bin 102 with dimensions of 32 inches in height, width, and depth. These dimensions can provide several advantages such as receiving a variety of different sized batteries into the battery collection and fire suppression system 100 in different battery storage configurations as will be discussed in further detail below. In some embodiments, the battery collection and fire suppression system 100 includes the battery collection bin 102 with dimensions scaled up or down relative to the dimensions of 32 inches in height, width, and depth to accommodate the storage and protection of different sizes and quantities of batteries. For example, the battery collection and fire suppression system 100 can include the battery collection bin 102 scaled up to accommodate one or more car battery packs, or scaled down to accommodate small batteries, for instance, those used to power handheld devices or other small electronic devices.

As illustrated in FIG. 1A, in one or more implementations, the battery collection bin 102 can include a lid 104, outer wall vents 108 in the outer walls 110, and locks 106. The locks 106 can secure the lid 104 closed. The lid 104 can secure batteries in a vertical or z-direction when in a closed position as will be discussed further below. Further, in one or more embodiments, the lid 104 selectively provides access to an inner cavity 112 as shown in FIG. 1B. Specifically, the lid 104 can provide access to the inner cavity 112 when in an open position. Further, the battery collection bin 102 can include inner walls defining the inner cavity 112 as discussed in further detail below. In one or more implementations, an inter-wall void separates the inner walls from the outer walls 110 as also discussed in further detail below.

In one or more embodiments, the lid 104 can include a valve to relieve pressure within the inner cavity 112 of the battery collection bin 102. For example, the battery collection bin 102 may experience high air pressure relative to the exterior environment for a variety of reasons, such as changing pressure conditions during transportation. Specifically, the lid can include a gate valve that opens to relieve high air pressure and automatically closes when the air pressure within the battery collection bin 102 and the air pressure of the exterior environment equalizes, or the pressure differential drops below a threshold of the gate valve. In particular, a high-pressure differential can cause the gate valve of the lid 104 to open and a lower pressure differential can cause the gate valve of the lid 104 to close.

In some embodiments, the outer wall vents can vent gases produced during the thermal event from the inner cavity 112. For example, the battery collection bin 102 can include the outer wall vents 108 on one or more sides as shown in FIGS. 1A and 1B. In some embodiments, the outer wall vents 108 can ensure that any gases produced during a thermal event are vented, thereby preventing the pressurization of the battery collection and fire suppression system 100 while the lid 104 is secured in a closed position by the locks 106.

In some implementations, the battery collection bin 102 includes a screen and a flap on outer wall vents 108. In these or other embodiments, the screen can prevent loss of fire suppressant and/or filtering material from within the inter-wall void. Accordingly, the screen can include a mesh sized to prevent individual components of the fire suppressant and/or filtering material from passing through the screen. Further, in one or more embodiments, the flap on the outer wall vents 108 diverts gases exiting the battery collection bin 102 through the outer wall vents 108. For example, based on the configuration of the flap, the flap can divert the gases in a specific direction. For example, in one or more implementations, the battery collection bin 102 can include a flap configured to divert the gas in a downward direction.

In one or more implementations, the battery collection bin 102 of the battery collection and fire suppression system 100 can include a variety of fire suppression and gas filtration features in case of a thermal event. For example, in one or more embodiments, each side of the battery collection bin 102 can include an inter-wall void between an inner wall and an outer wall. In these or other embodiments, this inter-wall void between the inner walls and outer walls of the battery collection bin 102 can contain fire suppressant and/or a filtering material. Further, the inner walls of the sides of the battery collection bin 102 can include inner wall vents to allow any gases produced during a thermal event to vent into the inter-wall void as discussed in further detail below.

In one or more embodiments, the battery collection bin 102 includes corner posts 114. Specifically, the corner posts 114 can support the stability of the battery collection bin 102 as part of an outer frame of the battery collection bin 102, such as frame 402. In one or more embodiments, the battery collection bin 102 can include hollow corner posts 114. In these or other embodiments, the battery collection bin 102 utilizes the hollow corner posts 114 to ventilate and filter gases produced during a thermal event. To ventilate and filter gases from a thermal event, the hollow corner posts 114 can include inner post vents, an inter-post void which can contain filtering material, and outer post vents.

Figure 8:
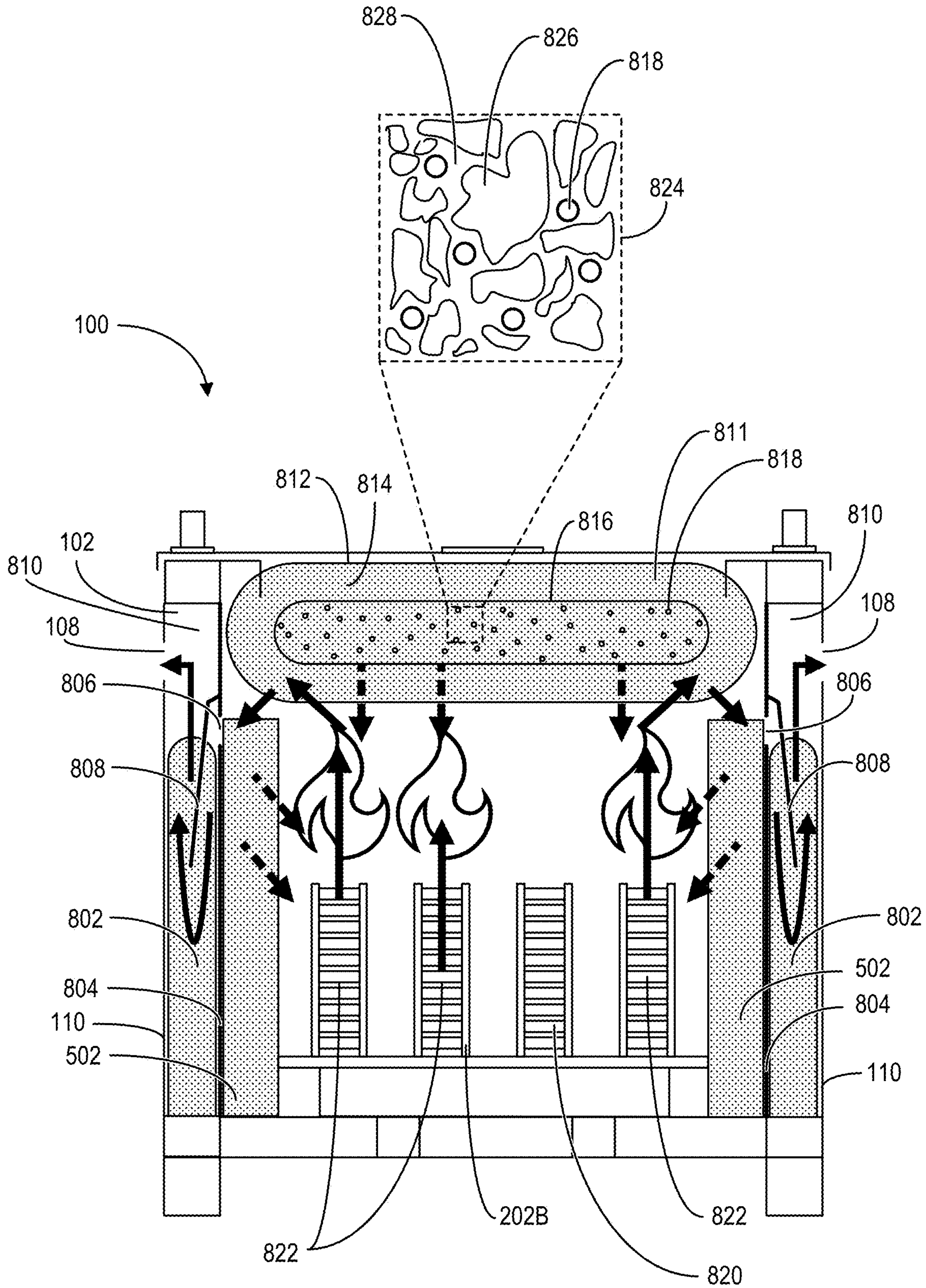
FIG. 8 illustrates a cross-sectional view of an exemplary battery collection and fire suppression system during a thermal event in accordance with one or more embodiments.

To illustrate, the hollow corner posts 114 can include inner vents similar to the inner wall vents 806 discussed in more detail with respect to FIG. 8. Indeed, in these or other embodiments, the inner post vents of the hollow corner posts 114 provide access from the inner cavity 112 of the battery collection bin 102 into the interior of the hollow corner posts 114. Additionally, the hollow corner posts 114 can include an inter-post void similar to the inter-wall void 810 of the inner walls 804. In one or more embodiments, the inter-post void can include filtering material to filter the gases before venting the gases to the exterior environment via the outer post vents. For example, the inner post vents, the inter-post void, and the filtering material can function similarly to the inner wall vents 806, the inter-wall void 810, and the filtering material 802 described in more detail with respect to FIG. 8.

Additionally, in one or more embodiments, the hollow corner posts 114 can direct the gases produced during a thermal event in particular directions through the inter-post void and out into the external environment. For example, the hollow corner posts 114 can include outer post vents and gas deflectors which function similarly to the outer wall vents 108 and the gas deflectors 808 as described with respect to FIG. 8. In one or more embodiments, the hollow corner posts 114 can direct the gases based on the position of the outer post vents by taking advantage of the air pressure differential between the inner cavity 112 of the battery collection bin 102 and the exterior environment during a thermal event. To illustrate outer post vent positioning, the hollow corner posts 114 can include outer post vents at the base of the hollow corner posts 114 such as into or near fork tubes 116. Thus, the battery collection and fire suppression system 100 can vent gases at the base allowing additional time for the gases to cool and diffuse in the exterior environment.

In one or more embodiments, the base 304 of the battery collection bin 102 may also include a hollow interior portion with an inter-base void connected to the inter-post void or the inter-wall void. In these or other embodiments, the base can include filtering material for filtering the gases and outer base vents underneath the battery collection bin 102 for venting gases to the exterior environment underneath the battery collection bin 102. In one or more embodiments, the battery collection bin 102 can include any combination of outer post vents, outer base vents, and outer wall vents.

Figure 2:
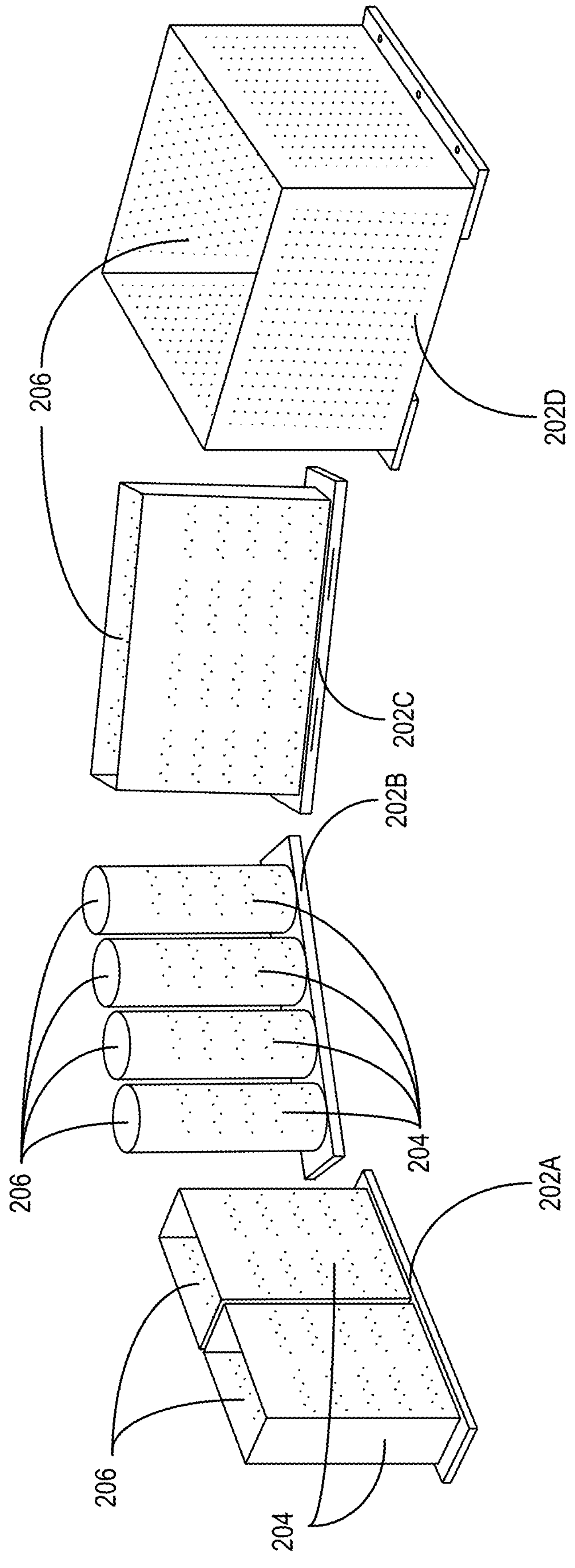
FIG. 2 illustrates a perspective view of exemplary modular inserts of a battery collection and fire suppression system in accordance with one or more embodiments.

In some embodiments, in addition to the battery collection bin 102, the battery collection and fire suppression system 100 includes inner components such as modular inserts. FIG. 2 illustrates a perspective view of exemplary modular inserts 202A-D in accordance with one or more embodiments. In some embodiments, the battery collection and fire suppression system 100 includes the modular inserts 202A-D inserted and held in place within the inner cavity of the battery collection bin 102.

As illustrated in FIG. 2, in some implementations, the battery collection and fire suppression system 100 includes modular inserts 202A-D sized and configured to hold individual batteries or multiple batteries. For example, the battery collection and fire suppression system 100 includes modular inserts 202A-D sized and configured to hold a single battery of specific dimensions, to hold multiple batteries of specific dimensions or to hold one or more batteries of a variety of dimensions, as discussed in more detail below.

As further illustrated in FIG. 2, in one or more embodiments, the modular inserts include a plurality of sleeves 204. For example, the modular inserts include sleeves 204 sized and configured to hold at least one battery. Indeed, each sleeve 204 can hold a single battery of specific dimensions, multiple batteries of specific dimensions, or one or more batteries of a variety of dimensions according to the size and dimensions of the sleeve 204. To illustrate, the e-bike insert 202B can hold an e-bike battery within each sleeve 204. Similarly, each sleeve 204 of the double insert 202A as well as the elongated insert 202C and the bulk insert 202D can accommodate specific batteries. Moreover, the modular inserts 202A-D can include any number of sleeves or any shape of sleeves according to a variety of factors such as the dimensions of the battery collection bin, the desired spacing between the sleeves, the dimensions of the batteries, etc.

Moreover, in one or more implementations, the sleeves 204 prevent heat and flames of a battery therein undergoing a thermal event from spreading to adjacent sleeves 204. For example, the modular inserts include sleeves 204 spaced away from adjacent sleeves 204 to prevent the heat and flames of a battery undergoing a thermal event within the sleeve 204 from spreading to the adjacent sleeves 204. Thus, in some embodiments, the modular inserts keep individual batteries separate from one another by providing space between sleeves 204 of the modular inserts as seen in the sleeves 204 of the double insert 202A and the sleeves 204 of the e-bike insert 202B. In some implementations, the battery collection and fire suppression system 100 includes fire suppressant in the spaces between sleeves as will be further discussed below.

As further shown in FIG. 2, in one or more embodiments, the modular inserts and/or the sleeves 204 of the modular inserts can include a top opening 206. For example, each sleeve 204 of the modular inserts 202A-B (i.e., the double insert 202A and the e-bike insert 202B) and each of the modular inserts 202C-D (i.e., the elongated insert 202C and the bulk insert 202D) can include a top opening 206 through which the sleeves 204 or modular inserts receive a battery or batteries. Moreover, in one or more implementations, the top openings 206 direct upward the heat and flames of a battery undergoing a thermal event within the sleeve 204. Indeed, in these or other embodiments, the top openings 206 direct the heat and flames upward toward one or more fire suppressant pillows positioned above the inner cavity of the battery collection bin as discussed in further detail below. Furthermore, in these or other embodiments, by directing the heat or flames upward, the top openings 206 prevent the heat or flames from spreading to adjacent sleeves 204 and the batteries contained therein.

Additionally, when multiple modular inserts are inserted into the battery collection bin 102, the battery collection and fire suppression system 100 holds the multiple modular inserts in place to include space between the multiple modular inserts as discussed in further detail below. In these or other embodiments, the spacing between the modular inserts within the battery collection bin can receive additional fire suppressant. Moreover, in some embodiments, the battery collection and fire suppression system 100 holds multiple modular inserts of a single type (e.g., 3 e-bike inserts 202B, 4 double inserts 202A, four bulk inserts 202D, etc.) or modular inserts of multiple different types (e.g., one double insert 202A, one e-bike insert 202B, and one elongated insert 202C).

In one or more implementations, the battery collection and fire suppression system 100 includes modular inserts 202A-D constructed of metal (e.g., an expanded steel), coated metal, plastic, cast foam glass, or other durable materials. Furthermore, the battery collection and fire suppression system 100 includes modular inserts 202A-D coated with a fireproofing and electrically non-conductive coating. The battery collection and fire suppression system 100 can include modular inserts 202A-D with any such coating, including, for example, a polyurea. Such a coating protects the modular inserts 202A-D such that they remain intact through a thermal event. Further, the coating aids in directing the heat, flames, and or gases toward fire suppressant.

As further illustrated in FIG. 2, the modular inserts 202A-D can include side openings. For example, the modular inserts 202A-D include side openings in the sides of the modular inserts 202A-D (i.e., including in the sides of the sleeves 204). Indeed, as shown in FIG. 2, each of the modular inserts 202A-D includes many side openings. In some implementations, the side openings direct heat and flames of a battery undergoing a thermal event within the modular insert or a sleeve 204 of the modular insert away from the battery. Additionally, or alternatively, in one or more embodiments, the side openings direct fire suppressant material within the inner cavity of the battery collection bin into the modular insert and/or a sleeve 204 thereof as discussed in further detail below.

Figure 3:
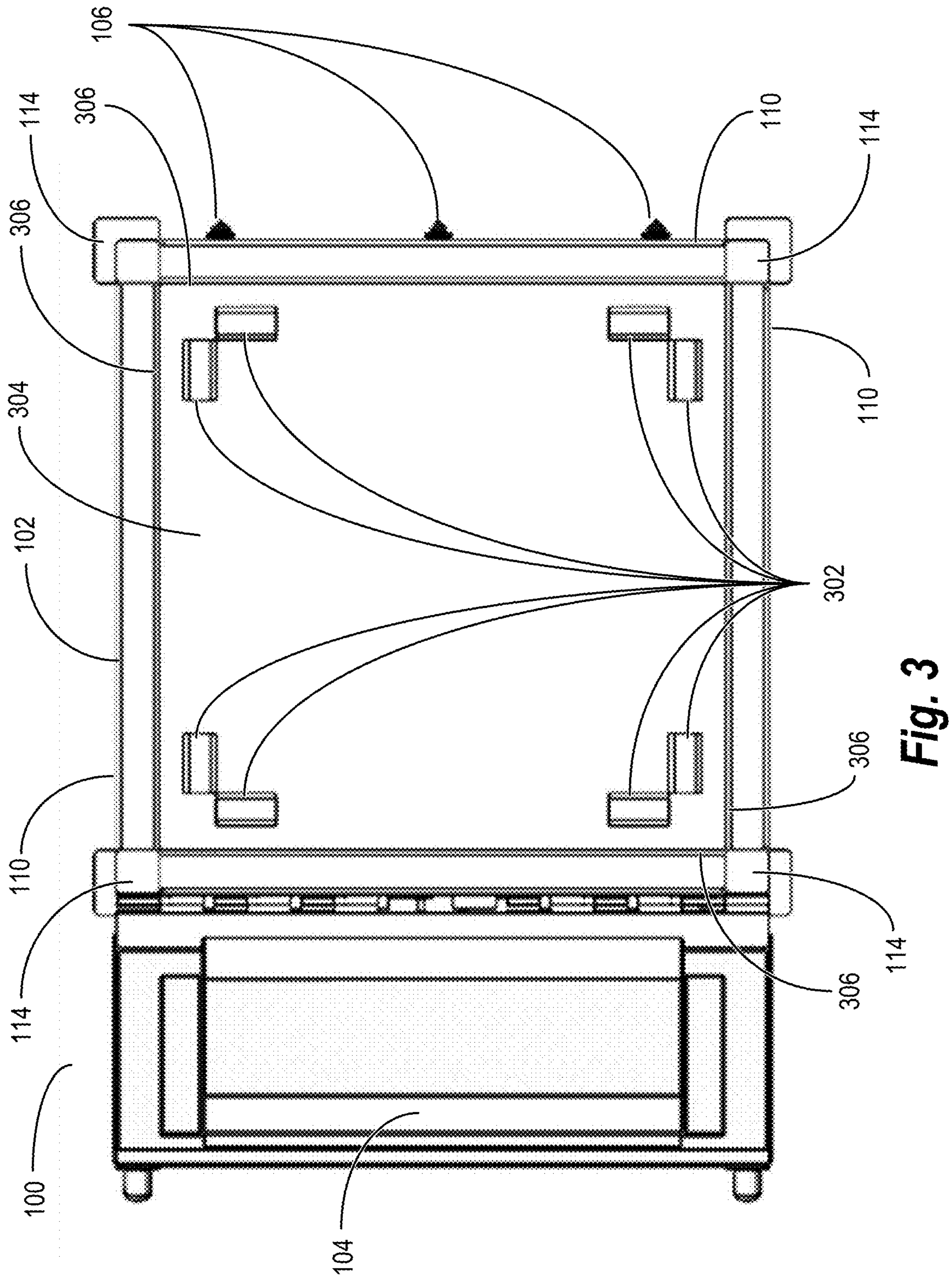
FIG. 3 illustrates a top-down view of an exemplary configuration of the battery collection bin of a battery collection and fire suppression system in accordance with one or more embodiments.

In one or more embodiments, the battery collection bin 102 can securely receive the modular inserts 202A-D to ensure the safety advantages of the battery collection and fire suppression system 100 are fully utilized. FIG. 3 illustrates a top-down view of an exemplary configuration of the battery collection bin 102 of the battery collection and fire suppression system 100. In one or more implementations, the lid 104 of the battery collection bin 102 can open to make accessible the inner cavity and the base 304 of the battery collection bin 102. Additionally, FIG. 3 illustrates the inner walls 306 defining the inner cavity. For example, in some embodiments, the four inner walls 306 of the battery collection bin 102 define the inner cavity as a rectangular (e.g., a square) void between the four inner walls 306. As mentioned above, in some implementations, an inter-wall void separates the inner walls 306 from the outer walls 110 as described in further detail below.

In one or more implementations, the battery collection bin 102 can include guides 302 fastened to the base 304 of the battery collection bin 102 as shown in FIG. 3. In these or other embodiments, the guides 302 attach to the base 304 of the battery collection bin 102 in a configuration that maintains space between the modular inserts 202A-D and the interior sides of the battery collection bin 102. For example, the battery collection and fire suppression system 100 can include guides 302 positioned as shown in FIG. 3 to accommodate the bulk insert 202D. Furthermore, the battery collection bin 102 can include additional guides to allow for insertion of multiple units of smaller modular inserts such as the double insert 202A or the e-bike insert 202B such that the smaller inserts are spaced from the interior walls of the sides of the battery collection bin 102 and from each other. In these or other embodiments, the guides 302 prevent movement of the modular inserts 202A-D in the x and y directions. As mentioned previously, the battery collection and fire suppression system 100 also prevents movement of the modular inserts 202A-D and other contents of the battery collection bin 102 in the z-direction by securing the lid 104 with the locks 106. Thus, in one or more embodiments, the battery collection and fire suppression system 100 can secure the batteries and modular inserts 202A-D from movement in all directions.

The guides 302 can have a strength and size to guide the modular inserts 202A-D into the proper position within the battery collection bin 102. By way of example, and not limitation, the battery collection and fire suppression system 100 can include two-inch by two-inch carbon steel tube guides 302. In other implementations, the guides have a different size or shape based on the corresponding modular inserts 202A-D.

As also illustrated in FIG. 3, the battery collection bin 102 can include corner posts 114. For example, FIG. 3 depicts a top-down view of the corner posts 114. In one or more embodiments, the corner posts 114 may be hollow for venting gases during a thermal event as described above with respect to FIG. 1.

Figure 4A:
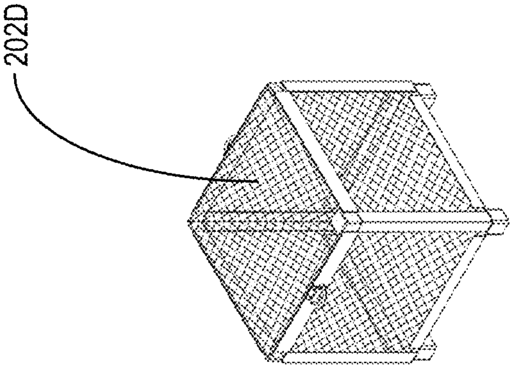
FIG. 4A illustrates a perspective view of a modular insert of an exemplary battery collection and fire suppression system in accordance with one or more embodiments.
Figure 4B:
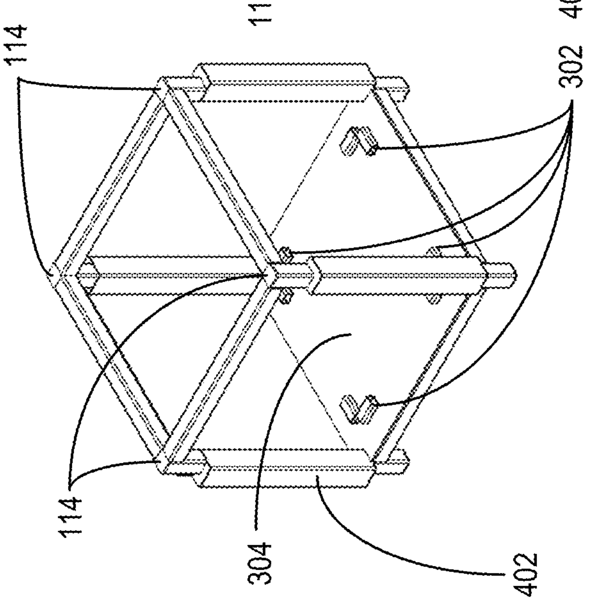
FIG. 4B illustrates a frame and guides of a battery collection bin of an exemplary battery collection and fire suppression system in accordance with one or more embodiments.
Figure 4C:
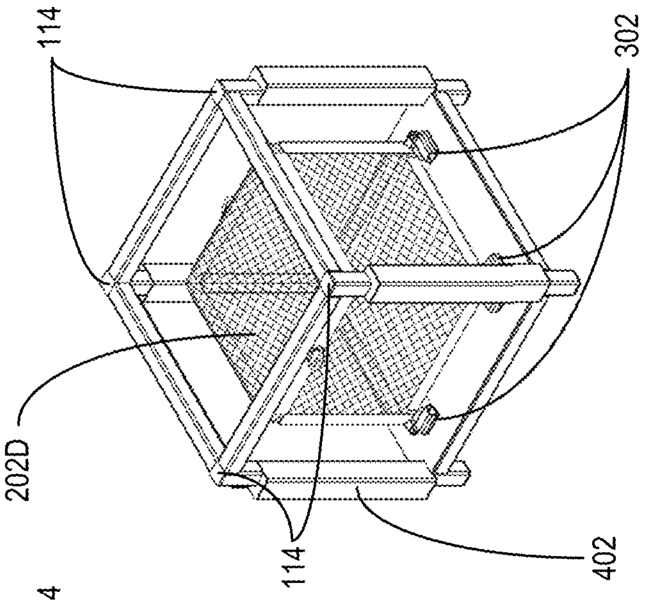
FIG. 4C illustrates a modular insert of a battery collection and fire suppression system positioned within a frame of a battery collection bin of the battery collection and fire suppression system in accordance with one or more embodiments.

FIGS. 4A-4C illustrate perspective views of the bulk insert 202D and the frame 402 of the battery collection bin 102 of the battery collection and fire suppression system 100 in accordance with one or more embodiments. FIG. 4A illustrates a perspective view of the bulk insert 202D. In this or other embodiments, the battery collection and fire suppression system 100 includes the bulk insert 202D with grated sides and side openings of the bulk insert 202D, as shown in FIGS. 4A and 4C. The grated sides and side openings of the bulk insert 202D allow ventilation of gases, heat, and flames from the battery in case of a thermal event. Further, in one or more implementations, the grated sides and side openings angle downward and inward toward the interior of the bulk insert 202D and the battery. In these or other embodiments, the downward and inward angling of the grating facilitates movement of the fire suppressant from between the bulk insert 202D and the battery collection bin 102 into the interior of the bulk insert to interact with the battery undergoing the thermal event to improve filtration and cooling of any gases produced as well as rapid suppression of fires. Additionally, the sides and side openings of other modular inserts can also angle downwardly and inwardly in the same way for at least the same purposes.

FIG. 4B illustrates a perspective view of the frame 402 of the battery collection bin 102 with the guides 302 in place on the base 304 to receive the bulk insert 202D in accordance with one or more embodiments. Additionally, FIG. 4C illustrates a perspective view of the bulk insert 202D held by the guides 302 within the frame 402 of the battery collection bin in accordance with one or more embodiments. This exemplary configuration of the battery collection and fire suppression system 100 demonstrates the position of the bulk insert 202D within the battery collection bin 102. In this manner, in some embodiments, the battery collection and fire suppression system 100 prevents the bulk insert 202D from movement in the x and y directions. Similarly, in some implementations, the battery collection and fire suppression system 100 secures the other modular inserts from movement in the x and y direction within the battery collection bin 102. Indeed, in one or more embodiments, the battery collection and fire suppression system 100 includes multiple modular inserts inserted into the battery collection bin and held in place by the guides 302. In these or other embodiments, the battery collection and fire suppression system 100 includes the guides 302 positioned to hold the multiple modular inserts such that they are spaced away from adjacent modular inserts within the inner cavity of the battery collection bin. As mentioned above, this spacing prevents heat and flams of a battery undergoing a thermal event from spreading across modular inserts (e.g., spreading from a battery within a modular insert, or a sleeve thereof, to a battery in an adjacent modular insert or sleeve thereof). In some implementations, with the modular inserts 202A-D in place within the battery collection bin 102, the battery collection and fire suppression system 100 can further include fire suppressant 502 either loose or in the form of fire suppressant pillows as will be discussed in further detail below. For instance, FIGS. 5A-D illustrate exemplary embodiments of the battery collection and fire suppression system 100 including the modular inserts 202A-D and the fire suppressant 502 within the battery collection bin 102.

In one or more embodiments, the battery collection and fire suppression system 100 can include the fire suppressant 502 either loose or enclosed to form a fire suppressant pillow. For instance, a fire suppressant pillow can include fire suppressant enclosed within a shroud to form the fire suppressant pillow. In one or more implementations, the battery collection and fire suppression system 100 can include a shroud made from any material that burns or melts under the heat of a thermal event such that at least a portion of the fire suppressant contained within the fire suppressant pillows automatically deploys during such an event. Further, the deployed fire suppressant 502 can react with the heat and/or flames to stop the thermal event as will be discussed further below.

Figure 5B:
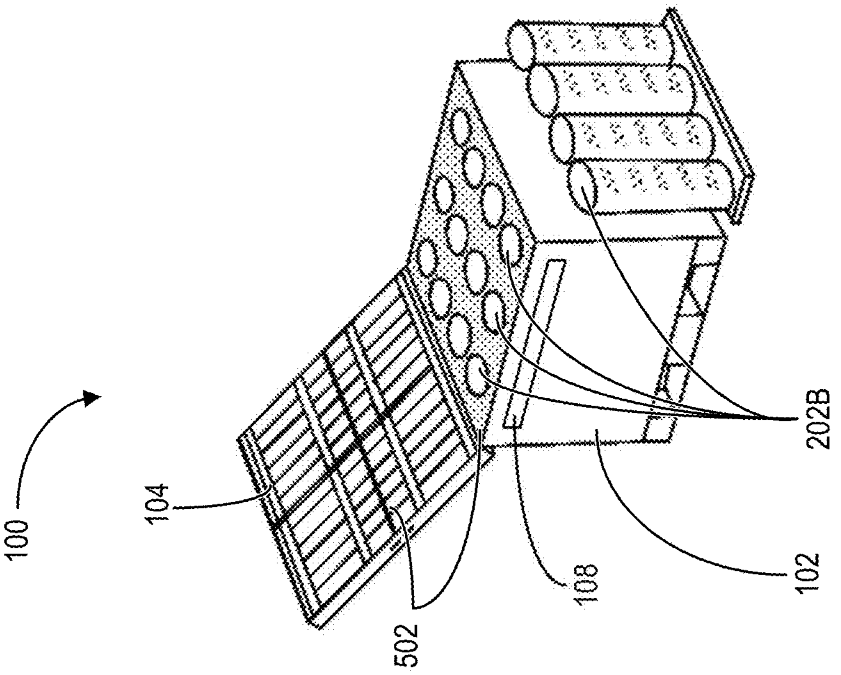
FIG. 5B illustrates a perspective view of an example e-bike insert and an exemplary embodiment of a battery collection and fire suppression system including e-bike inserts and fire suppressant within a battery collection bin in accordance with one or more embodiments.
Figure 5A:
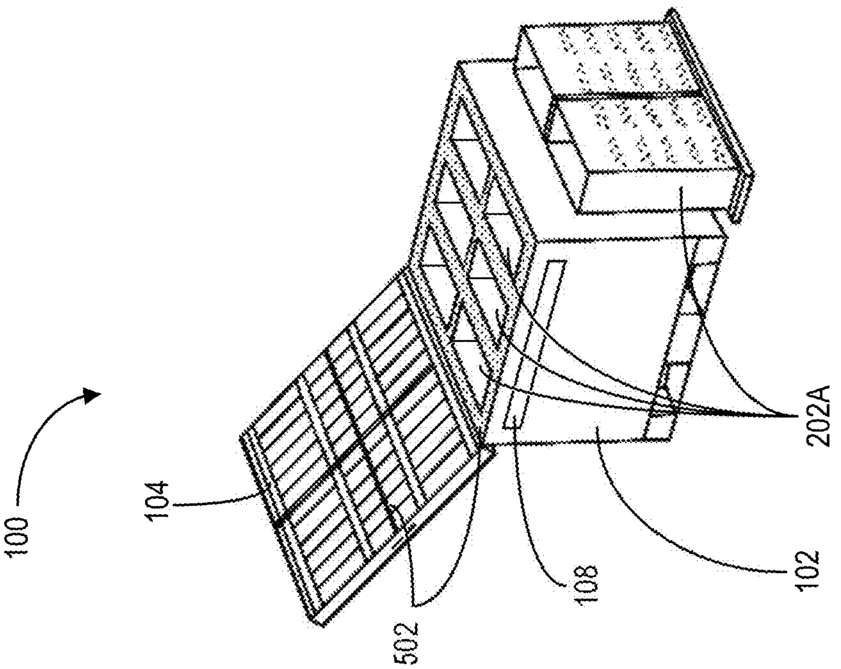
FIG. 5A illustrates a perspective view of an example double insert and an exemplary embodiment of a battery collection and fire suppression system including double inserts and fire suppressant within a battery collection bin in accordance with one or more embodiments.

As illustrated, in FIG. 5A, in one or more implementations, the battery collection and fire suppression system 100 can include multiple double inserts 202A within the inner cavity of the battery collection bin 102. Further, in these or other embodiments, the battery collection and fire suppression system 100 includes fire suppressant 502 within the inner cavity of the battery collection bin 102 positioned about the double inserts 202A and the sleeves of the double inserts 202A. For example, the battery collection and fire suppression system 100 can include fire suppressant 502 placed at the bottom of the battery collection bin 102. Further, the battery collection and fire suppression system 100 can include fire suppressant 502, either loose or in fire suppressant pillows, on one or more sides of the interior of the battery collection bin 102. The fire suppressant 502 on the sides of the battery collection bin 102 can occupy the space between the double inserts 202A and the interior walls of the battery collection bin 102. Furthermore, the battery collection and fire suppression system 100 can include fire suppressant 502, loose or as fire suppressant pillows, between the multiple double inserts 202A when the battery collection and fire suppression system 100 includes multiple double inserts 202A inserted into the battery collection bin 102, as illustrated in FIG. 5A.

Moreover, the battery collection and fire suppression system 100 can include fire suppressant 502, either loose or in fire suppressant pillows, positioned on top of the double inserts 202A and beneath the lid 104. For example, as shown in FIG. 5A, the battery collection and fire suppression system 100 includes fire suppressant 502 in the form of fire suppressant pillows positioned above the inner cavity of the battery collection bin 102. Indeed, the fire suppressant pillows shown on the interior of the lid 104 of the battery collection bin 102 in FIG. 5A automatically deploy fire suppressant into the inner cavity during a thermal event (e.g., when the lid 104 is closed). In some implementations, this fire suppressant 502 can act with the lid 104 in securing the double inserts 202A and the batteries contained therein in the z direction as discussed above. Further, in implementations where the fire suppressant between the top of the double inserts 202A and the lid 104 includes fire suppressant pillows, the fire suppressant pillows can attach to or remain detached from the lid 104.

As illustrated, in FIG. 5B, in one or more implementations, the battery collection and fire suppression system 100 can include multiple e-bike inserts 202B within the inner cavity of the battery collection bin 102. Further, in these or other embodiments, the battery collection and fire suppression system 100 includes fire suppressant 502 within the inner cavity of the battery collection bin 102 positioned about the e-bike inserts 202B and the sleeves of the e-bike insert 202B. For example, the battery collection and fire suppression system 100 can include fire suppressant 502 placed at the bottom of the battery collection bin 102. Further, the battery collection and fire suppression system 100 can include fire suppressant 502, either loose or in fire suppressant pillows, on one or more sides of the interior of the battery collection bin 102. The fire suppressant 502 on the sides of the battery collection bin 102 can occupy the space between the e-bike inserts 202B and the interior walls of the battery collection bin 102. Furthermore, the battery collection and fire suppression system 100 can include fire suppressant 502, loose or as fire suppressant pillows, between the multiple e-bike inserts 202B when the battery collection and fire suppression system 100 includes multiple e-bike inserts 202B inserted into the battery collection bin 102, as illustrated in FIG. 5B.

Moreover, the battery collection and fire suppression system 100 can include fire suppressant 502, either loose or in fire suppressant pillows, positioned on top of the e-bike inserts 202B and beneath the lid 104. For example, as shown in FIG. 5B, the battery collection and fire suppression system 100 includes fire suppressant 502 in the form of fire suppressant pillows positioned above the inner cavity of the battery collection bin 102. Indeed, the fire suppressant pillows shown on the interior of the lid 104 of the battery collection bin 102 in FIG. 5B automatically deploy fire suppressant into the inner cavity during a thermal event (e.g., when the lid 104 is closed). In some implementations, this fire suppressant 502 can act with the lid 104 in securing the e-bike inserts 202B and the batteries contained therein in the z direction as discussed above. Further, in implementations where the fire suppressant between the top of the e-bike inserts 202B and the lid 104 includes fire suppressant pillows, the fire suppressant pillows attach to or remain detached from the lid 104.

Figure 5D:
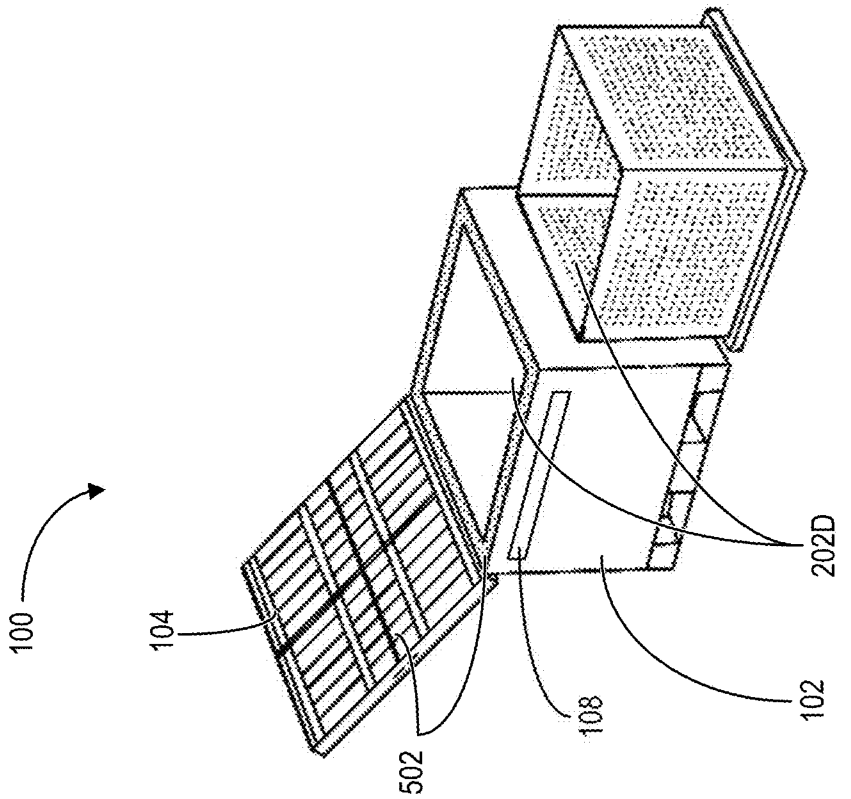
FIG. 5D illustrates a perspective view of an example bulk insert and an exemplary embodiment of a battery collection and fire suppression system including bulk inserts and fire suppressant within a battery collection bin in accordance with one or more embodiments.
Figure 5C:
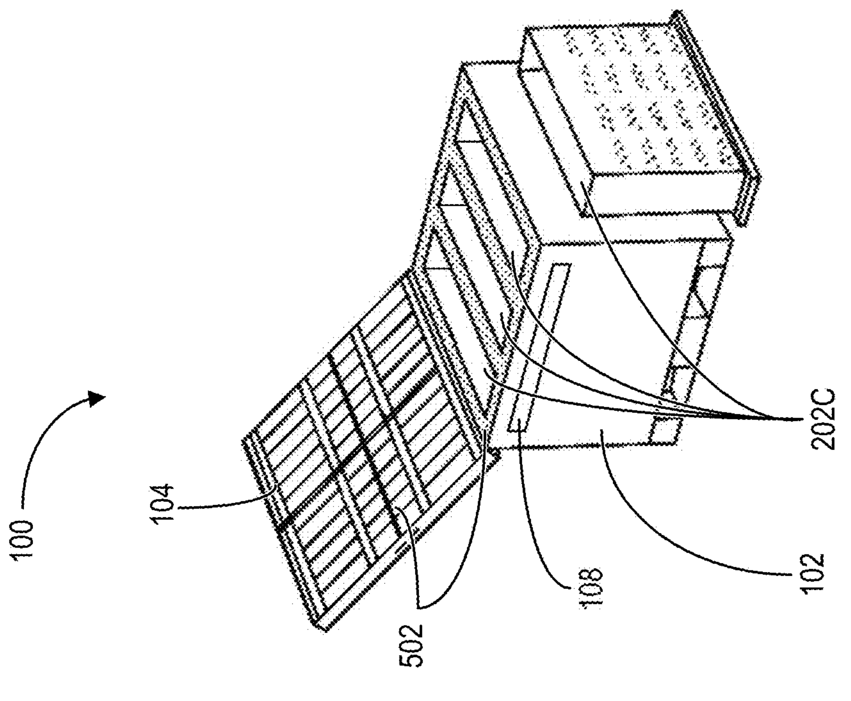
FIG. 5C illustrates a perspective view of an example elongated insert and an exemplary embodiment of a battery collection and fire suppression system including elongated inserts and fire suppressant within a battery collection bin in accordance with one or more embodiments.

As illustrated, in FIG. 5C, in one or more implementations, the battery collection and fire suppression system 100 can include multiple elongated inserts 202C within the inner cavity of the battery collection bin 102. Further, in these or other embodiments, the battery collection and fire suppression system 100 includes fire suppressant 502 within the inner cavity of the battery collection bin 102 positioned about the elongated inserts 202C. For example, the battery collection and fire suppression system 100 can include fire suppressant 502 placed at the bottom of the battery collection bin 102. Further, the battery collection and fire suppression system 100 can include fire suppressant 502, either loose or in fire suppressant pillows, on one or more sides of the interior of the battery collection bin 102. The fire suppressant 502 on the sides of the battery collection bin 102 can occupy the space between the elongated inserts 202C and the interior walls of the battery collection bin 102. Furthermore, the battery collection and fire suppression system 100 can include fire suppressant 502, loose or as fire suppressant pillows, between the multiple elongated inserts 202C when the battery collection and fire suppression system 100 includes multiple elongated inserts 202C inserted into the battery collection bin 102, as illustrated in FIG. 5C.

Moreover, the battery collection and fire suppression system 100 can include fire suppressant 502, either loose or in fire suppressant pillows, positioned on top of the elongated inserts 202C and beneath the lid 104. For example, as shown in FIG. 5C, the battery collection and fire suppression system 100 includes fire suppressant 502 in the form of fire suppressant pillows positioned above the inner cavity of the battery collection bin 102. Indeed, the fire suppressant pillows shown on the interior of the lid 104 of the battery collection bin 102 in FIG. 5C automatically deploy fire suppressant into the inner cavity during a thermal event (e.g., when the lid 104 is closed). In some implementations, this fire suppressant 502 can act with the lid 104 in securing the elongated inserts 202C and the batteries contained therein in the z direction as mentioned above. Further, in implementations where the fire suppressant between the top of the elongated inserts 202C and the lid 104 includes fire suppressant pillows, the fire suppressant pillows attach to or remain detached from the lid 104.

As illustrated, in FIG. 5D, in one or more implementations, the battery collection and fire suppression system 100 can include a bulk insert 202D within the inner cavity of the battery collection bin 102. Further, in these or other embodiments, the battery collection and fire suppression system 100 includes fire suppressant 502 within the inner cavity of the battery collection bin 102 positioned about the bulk insert 202D. For example, the battery collection and fire suppression system 100 can include fire suppressant 502 placed at the bottom of the battery collection bin 102. Further, the battery collection and fire suppression system 100 can include fire suppressant 502, either loose or in fire suppressant pillows, on one or more sides of the interior of the battery collection bin 102. The fire suppressant 502 on the sides of the battery collection bin 102 can occupy the space between the bulk insert 202D and the interior walls of the battery collection bin 102. Furthermore, the battery collection and fire suppression system 100 can include fire suppressant 502, loose or as fire suppressant pillows, between the bulk inserts 202D when the battery collection and fire suppression system 100 includes multiple bulk inserts 202D inserted into the battery collection bin 102. For example, in some cases, the battery collection bin 102 can hold multiple bulk inserts by scaling up the dimensions of the battery collection bin.

Moreover, the battery collection and fire suppression system 100 can include fire suppressant 502, either loose or in fire suppressant pillows, positioned on top of the bulk insert 202D and beneath the lid 104. For example, as shown in FIG. 5D, the battery collection and fire suppression system 100 includes fire suppressant 502 in the form of fire suppressant pillows positioned above the inner cavity of the battery collection bin 102. Indeed, the fire suppressant pillows shown on the interior of the lid 104 of the battery collection bin 102 in FIG. 5D automatically deploy fire suppressant into the inner cavity during a thermal event (e.g., when the lid 104 is closed). In some implementations, this fire suppressant 502 can act with the lid 104 in securing the bulk insert 202D and the batteries contained therein in the z direction as discussed above. Further, in implementations where the fire suppressant between the top of the bulk insert 202D and the lid 104 is in the form of fire suppressant pillows, the fire suppressant pillows attach to or remain detached from the lid 104.

Figure 6B:
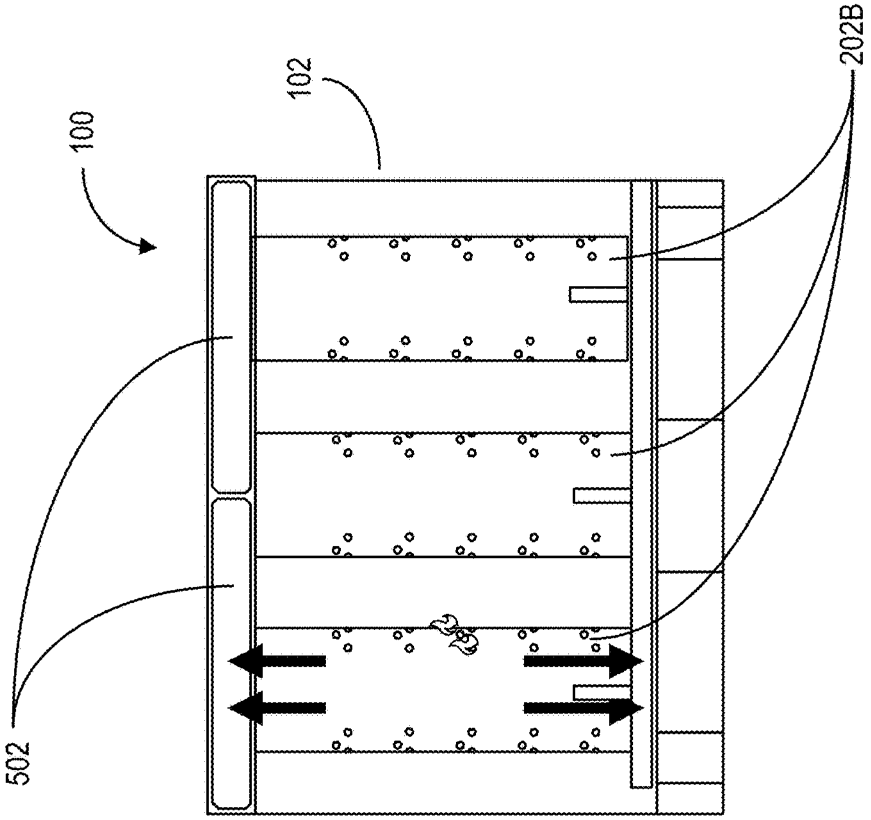
FIG. 6B illustrates a side view of the interior of a battery collection bin containing modular inserts of a battery collection and fire suppression system in accordance with one or more embodiments.
Figure 6A:
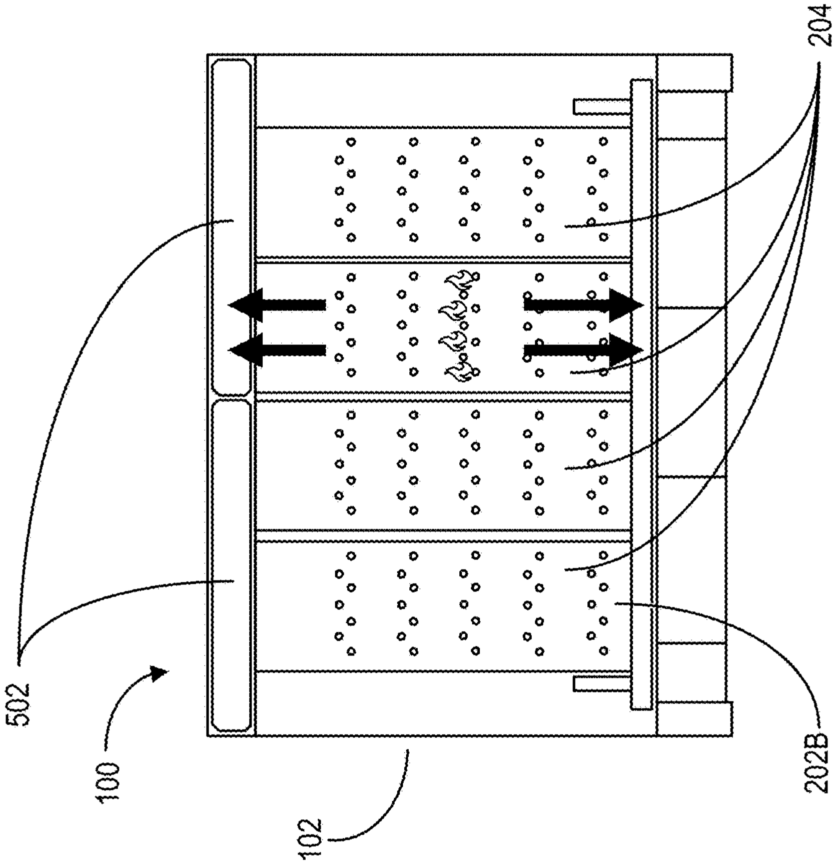
FIG. 6A illustrates a front view of the interior of a battery collection bin containing modular inserts of a battery collection and fire suppression system in accordance with one or more embodiments.

In one or more implementations, the modular inserts 202A-D of the battery collection and fire suppression system 100 can facilitate rapid suppression of fire during a thermal event. For instance, FIGS. 6A and 6B show a front view and a side view, respectively, of the interior of the battery collection bin 102 containing modular inserts in accordance with one or more embodiments. More specifically, FIGS. 6A and 6B-show the battery collection bin 102 containing one or more e-bike inserts 202B with a battery in one of the sleeves undergoing a thermal event. The FIG. 6A front view shows the four sleeves of a single e-bike insert 202B within the inner cavity of the battery collection bin 102. The FIG. 6B side view shows only one sleeve of three individual e-bike inserts 202B within the inner cavity of the battery collection bin 102.

As shown in FIGS. 6A and 6B, in one or more embodiments, the e-bike insert 202B can direct the heat (illustrated as solid arrows) and flames of a thermal event toward the top and bottom of the battery collection and fire suppression system 100. For example, the e-bike insert 202B directs the heat and flames through a top opening and side openings thereof. Indeed, as mentioned previously, the e-bike insert 202B directs heat and flames of the battery undergoing the thermal event away from the battery and/or directs fire suppressant material within the inner cavity into the e-bike insert 202B or the sleeves thereof.

To illustrate, as shown in FIGS. 6A and 6B, the e-bike insert 202B directs the heat and flames upward toward the fire suppressant 502 (e.g., in the form of a fire suppressant pillow). Further, the e-bike insert 202B directs the flames out the side openings and downward toward fire suppressant at the bottom of the battery collection bin 102. By directing the heat and flames upward toward the top and downward toward the bottom of the battery collection and fire suppression system 100, the e-bike insert 202B directs most of the heat and flames to interact with the fire suppressant 502 above, below, or to the side of the battery undergoing a thermal event to initiate rapid fire suppression as discussed in further detail below. In this manner, the battery collection and fire suppression system 100 can prevent heat from a single battery from spreading to other batteries within different sleeves of the same modular insert, as illustrated in FIG. 6A or to batteries contained within adjacent modular inserts, as depicted in FIG. 6B.

Moreover, as also illustrated in FIG. 6A, the battery collection and fire suppression system 100 includes the sleeves 204 of the e-bike insert 202B spaced away from one another to prevent spreading of heat and flames from one sleeve 204, or battery therein, of the e-bike insert 202B to another during a thermal event. To illustrate, FIG. 6A illustrates the battery in the second sleeve from the right undergoing a thermal event. In this example, the battery collection and fire suppression system 100 prevents the heat and flames of the battery undergoing the thermal event from spreading to the adjacent sleeves via the spacing between the sleeves. As further shown in FIG. 6B, the battery collection and fire suppression system 100 prevents the heat and flames from spreading from each e-bike insert 202B to the adjacent e-bike inserts by the spacing between the e-bike inserts 202B.

Figure 7B:
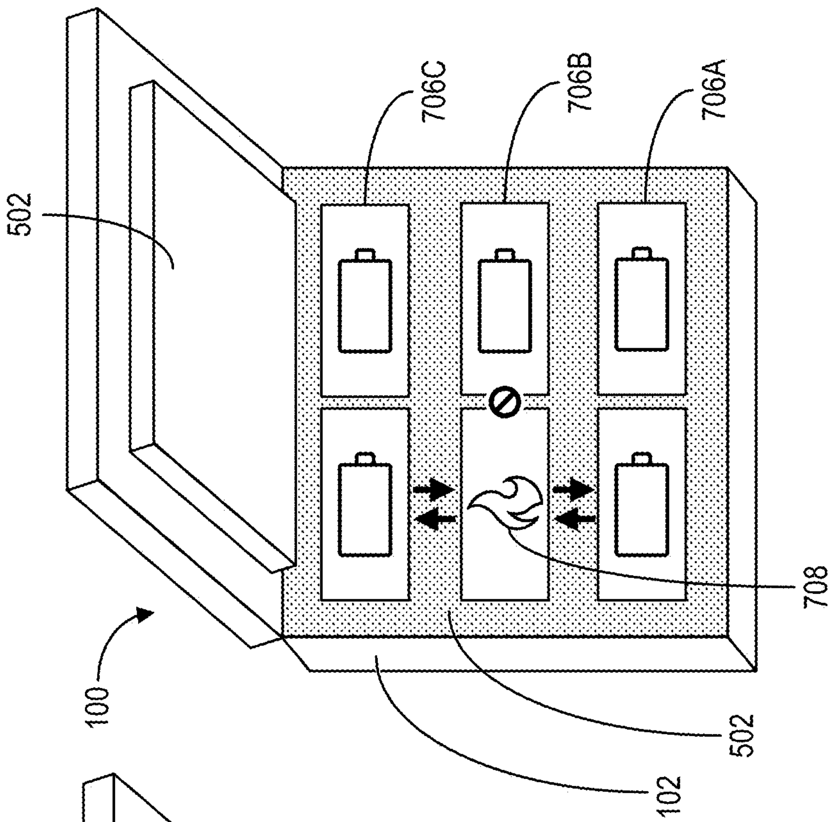
FIG. 7B illustrates a top view of an exemplary battery collection and fire suppression system during a thermal event in accordance with one or more embodiments.
Figure 7A:
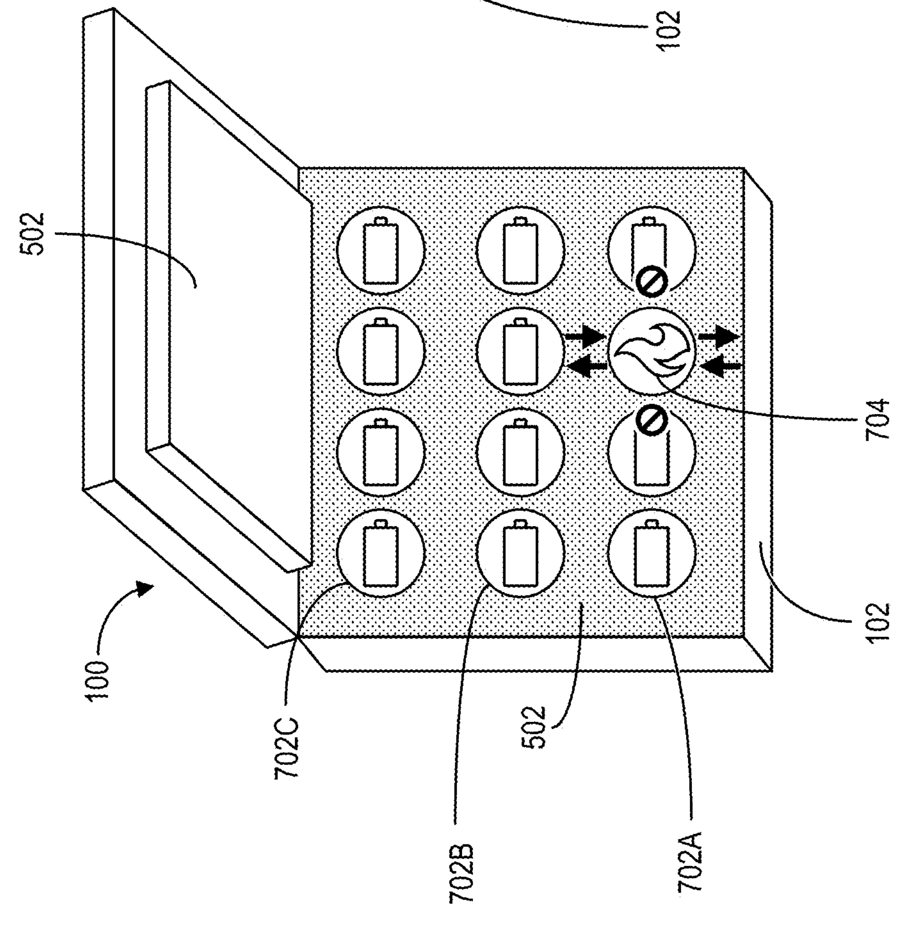
FIG. 7A illustrates a top view of an exemplary battery collection and fire suppression system during a thermal event in accordance with one or more embodiments.

Similarly, FIGS. 7A and 7B further illustrate the modular inserts containing thermal events by directing heat primarily upwards and downwards within the battery collection and fire suppression system 100. For example, FIGS. 7A and 7B illustrate a top view of exemplary battery collection and fire suppression systems 100 during a thermal event.

FIG. 7A shows a perspective view of the battery collection and fire suppression system 100 including three e-bike inserts 702A-C, wherein each of the e-bike inserts 702A-C includes four sleeves and each sleeve contains a battery. In some embodiments, the battery collection and fire suppression system 100 positions the e-bike inserts 702A-C within the inner cavity of the battery collection bin 102 to prevent heat or flames of a battery 704 undergoing a thermal event from spreading to adjacent modular inserts, or batteries contained therein. For example, the battery collection bin 102 holds the e-bike inserts 702A-C spaced away from one another. Indeed, in these or other embodiments, the battery collection and fire suppression system 100 includes each e-bike insert 702A-C spaced away from adjacent e-bike inserts within the inner cavity of the battery collection bin 102. The spacing between the e-bike inserts 702A-C, in some implementations, prevents the heat and flames of the battery 704 from spreading across the e-bike inserts 702A-C.

To illustrate, the spacing between the e-bike inserts 702A-B prevents the heat and flames of the battery 704 undergoing a thermal event in the e-bike insert 702A from spreading to the adjacent e-bike insert 702B and the batteries contained within the sleeves thereof. In one or more embodiments, the battery collection bin 102 and/or the adjacent e-bike insert 702B reflect the heat and/or flames leaving the battery 704 undergoing the thermal event (as illustrated by the arrows leaving the battery) back to the battery 704 (as illustrated by the arrows returning to the battery). Moreover, the spacing between sleeves of the e-bike insert 702A prevents the heat and/or flames of the battery 704 undergoing the thermal event from spreading to adjacent sleeves of the e-bike insert 702A as illustrated by the prohibition symbol on either side of the battery 704 undergoing the thermal event, as more particularly described with respect to FIG. 6A.

Additionally, in one or more implementations, the spacing between the e-bike inserts 702A-C prevents spread of heat and flames of the battery 704 by including the fire suppressant 502 in the spaces between the e-bike inserts 702A-C. In these or other embodiments, the battery collection and fire suppression system 100 automatically deploys the fire suppressant 502 during a thermal event as described in further detail below.

Similarly, FIG. 7B illustrates a view of the battery collection and fire suppression system 100 including three double inserts 706A-C, wherein each of the double inserts 706A-C includes two sleeves and each sleeve contains a battery. In some embodiments, the battery collection and fire suppression system 100 positions the double inserts 706A-C within the inner cavity of the battery collection bin 102 to prevent heat or flames of a battery 708 undergoing a thermal event from spreading to adjacent modular inserts, or batteries contained therein. For example, the battery collection bin 102 holds the double inserts 706A-C spaced away from one another. Indeed, in these or other embodiments, the battery collection and fire suppression system 100 includes each double insert 706A-C spaced away from adjacent double inserts within the inner cavity of the battery collection bin 102. The spacing between the double inserts 706A-C, in some implementations, prevents the heat and flames of the battery 708 from spreading across the double inserts 706A-C.

To illustrate, the spacing between the double inserts 706A-B and 706 B-C prevents the heat and flames of the battery 708 undergoing a thermal event in the double insert 706B from spreading to the adjacent double inserts 706A or 706C and the batteries contained within the sleeves thereof. In one or more embodiments, the adjacent double inserts 706A and 706C reflect the heat and/or flames leaving the battery 708 undergoing the thermal event (as illustrated by the arrows leaving the battery) back to the battery 708 (as illustrated by the arrows returning to the battery). Moreover, the spacing between sleeves of the double insert 706B prevents the heat and/or flames of the battery 708 undergoing the thermal event from spreading to the adjacent sleeve of the double insert 706B as illustrated by the prohibition symbol between the sleeves of the double insert 706B, as more particularly described with respect to FIG. 6A.

Additionally, in one or more implementations, the spacing between the double inserts 706A-C prevents spread of heat and flames of the battery 708 by including the fire suppressant 502 in the spaces between the double inserts 706A-C. In these or other embodiments, the battery collection and fire suppression system 100 automatically deploys the fire suppressant 502 during a thermal event as described in further detail below.

In some implementations, the battery collection and fire suppression system 100 can rapidly suppress a thermal event of one or more batteries as well as vent and filter any gases produced during the thermal event. For example, FIG. 8 illustrates a cross-sectional view of an exemplary battery collection and fire suppression system 100 during a thermal event. Batteries undergoing a thermal event can produce gases (as illustrated by the solid arrows in FIG. 8) which the battery collection and fire suppression system 100 must vent to prevent creating pressure within the battery collection and fire suppression system 100 and filtered to prevent health and safety hazards when vented.

As shown in FIG. 8, in some embodiments, the battery collection and fire suppression system 100 can include inner wall vents 806 and gas deflectors 808, among other features, to vent and filter gases produced by a thermal event. For example, as illustrated in FIG. 8 and as mentioned previously, each side of the battery collection bin 102 can include an inner wall 804 and an outer wall 110 which are separated by an inter-wall void 810. In one or more embodiments, inner walls 804 can include inner wall vents 806 that vent gases produced from the interior of the battery collection bin 102 into the inter-wall void 810 between the outer wall 110 and the inner wall 804 during a thermal event. In these or other embodiments, the battery collection and fire suppression system 100 filters the gases through a filtering material 802 (e.g., the fire suppressant 502) filling the inter-wall void 810. Further, the outer wall vents 108 vent the gases from the inter-wall void 810 to the environment exterior to the battery collection and fire suppression system 100.

To illustrate, as shown in FIG. 8, during the thermal event shown within the inner cavity, the battery collection and fire suppression system 100 vents the gases (depicted by the solid arrows) from the inner cavity of the battery collection bin 102 through the inner wall vents 806 in the inner walls 804 into the inter-wall void 810. Further, the battery collection and fire suppression system 100 filters the gases through the filtering material 802 within the inter-wall void 810. Finally, the battery collection and fire suppression system 100 vents the filtered gases from the inter-wall void 810 to the exterior environment via the outer wall vents 108 in the outer walls 110.

As further illustrated in FIG. 8, in some implementations, the battery collection and fire suppression system 100 includes the outer wall vents 108 offset from the inner wall vents 806. Indeed, in these or other embodiments, the battery collection and fire suppression system 100 includes the outer wall vents 108 above the inner wall vents 806 such that gases passing from the inner wall vents 806 to the outer wall vents 108 must pass through the filtering material 802 within the inter-wall void 810. Moreover, in these or other embodiments, the battery collection and fire suppression system 100 includes the filtering material filling the inter-wall void 810 to a level at or above the top of the inner wall vents 806. In these or other embodiments, the battery collection and fire suppression system 100 can vent the gases without including a gas deflector 808.

As also shown in FIG. 8, in some embodiments, the battery collection and fire suppression system 100 can include gas deflectors 808 to aid in filtering gases from the inner cavity of the battery collection bin 102. As mentioned previously, the outer walls 110 of the sides of the battery collection bin 102 can include outer wall vents 108 for venting gases out of the battery collection and fire suppression system 100. To aid in the filtering of gas through the filtering material 802 in the inter-wall void 810, the battery collection and fire suppression system 100 can include gas deflectors 808 configured to be attached to the inner walls 804 and direct gas through the filtering material 802. For example, the gas deflectors 808 can attach to the inner walls above the inner wall vents 806 and extend into the inter-wall void 810 (e.g., at an angle as represented in FIG. 8).

To illustrate, in one or more embodiments, the gas deflectors 808 can extend into the inter-wall void 810, and the filtering material 802 contained therein. In these or other embodiments, the gas deflectors 808 can extend below the outer wall vents 108 and the inner wall vents 806 such that the gas deflectors 808 direct the gases passing from the inner wall vents 806 to the outer wall vents 108 through the filtering material 802 in the inter-wall void 810 as shown in FIG. 8. Indeed, in these or other embodiments, the gas deflectors 808 direct the gases downward through the filtering material 802 to improve the quantity and/or quality of filtration prior to venting.

Additionally, the gas deflectors 808 can have different lengths in different implementations of the battery collection and fire suppression system 100. For instance, longer deflectors force the gas to travel further through the filtering material 802 contained within the inter-wall void 810 which can result in more thorough filtering (i.e., higher quality filtration), or filtering of a higher volume of the gas (higher quantity of filtration). Thus, in these or other embodiments, the battery collection and fire suppression system 100 can include lengths of the gas deflectors 808 tailored to the amount of filtering required and/or the amount of gas expected during thermal events.

Further, in one or more implementations, the battery collection and fire suppression system 100 can include the gas deflectors 808 that attach to the battery collection bin 102 in a variety of locations and configurations. For example, in some embodiments, the battery collection and fire suppression system 100 can include the gas deflectors 808 attached to the battery collection bin in different places within the inter-wall void 810. In some implementations, the battery collection and fire suppression system 100 includes the gas deflectors 808 attached to the outer walls 110 within the inter-wall void 810 (e.g., above the top of the outer wall vents 108). Indeed, the battery collection and fire suppression system 100 can include the gas deflectors 808 attached anywhere within the inter-wall void 810 so long as the gas deflectors 808 allow the gas to enter into the inter-wall void 810 and direct the gases through the filtering material 802 before the battery collection and fire suppression system 100 vents the gas out the outer wall vents 108.

Additionally, thermal events produce heat and flames which if left unchecked can spread to additional batteries and/or create a health and safety hazard during storage or transportation of the battery collection and fire suppression system 100. As mentioned above, in some implementations, the modular inserts 202A-D can deflect a portion of lateral heat and flame movement into vertical movement, either upwards or downwards during a thermal event. In such an event, in some embodiments, the battery collection and fire suppression system 100 deflects rising heat toward a top fire suppressant pillow 811.

As illustrated in FIG. 8, in some implementations, the battery collection and fire suppression system 100 includes one or more top fire suppressant pillows (e.g., a single top fire suppressant pillow 811 as shown in FIG. 8). Moreover, in one or more embodiments, the battery collection and fire suppression system 100 includes the top fire suppressant pillow 811 positioned between the inner cavity and the lid of the battery collection bin 102 such that the top fire suppressant pillow 811 covers the inner cavity from above. Furthermore, in one or more implementations, the top fire suppressant pillow 811 includes fire suppressant 814 enclosed within a shroud 812.

As further illustrated in FIG. 8, in some embodiments, the shroud 812 of the top fire suppressant pillow 811 can melt or burn to deploy the fire suppressant 814 to a targeted location of the thermal event. For example, the shroud 812 can selectively burn in areas directly above the heat and flames of one or more batteries 822 undergoing a thermal event to automatically deploy the fire suppressant 814 to the location of the batteries 822. In these or other embodiments, the battery collection and fire suppression system 100 can automatically deploy the fire suppressant 814 (e.g., via gravity) through the selectively melted or burned portion of the shroud 812 into the inner cavity as illustrated by the dashed arrows leaving the top fire suppressant pillow 811. Specifically, in these or other embodiments, the battery collection and fire suppression system 100 deploys the fire suppressant 814 onto the batteries 822 undergoing the thermal event in the e-bike insert 202B (i.e., in the sleeves thereof). Alternatively, in some implementations, the portions of the shroud 812 not affected by the heat and flames of a thermal event (e.g., the portion above the battery 820 not undergoing a thermal event) remain intact. In these or other embodiments, the intact portion of the shroud 812 retains a portion of the fire suppressant 814 and/or prevents the fire suppressant 814 from being deployed onto the battery 820 not undergoing a thermal event. Thus, in one or more embodiments, the battery collection and fire suppression system 100 rapidly and automatically suppresses thermal events in a targeted manner.

As additionally illustrated in FIG. 8, in one or more implementations, the top fire suppressant pillow 811 can include a sub-compartment 816. Specifically, the sub-compartment 816 has a high moisture environment that ruptures to cool the inner cavity and suppress heat and flames during a thermal event by deploying the components of the sub-compartment 816. The components of the sub-compartment 816 can include, for example, water, the fire suppressant 814, and/or a silica gel 818 (e.g., a silica gel charged with water). For instance, the components of the sub-compartment 816 can include a foam glass, a silica gel 818, and water. In these or other embodiments, the components of the sub-compartment 816 include about 14 ounces of water mixed with about 1.5 gallons of foam glass. In other embodiments, the components of the sub-compartment 816 can include varying amounts of water (or other fire-retardant substance) mixed with foam glass (or other fire suppressant), for example, any of 8 ounces, 10 ounces, 12 ounces, 16 ounces, 18 ounces, or 20 ounces of water mixed with any of 0.75, 1.0, 1.25, 1.75, 2.0, or 2.25 gallons of foam glass. Additionally, in these or other embodiments, the silica gel "charges" by absorbing at least a portion of the water (or other fire-retardant substance) for later release upon deployment of the sub-compartment 816 components during a thermal event.

To further illustrate, detailed view 824 illustrates an enlarged view of one example of the components of the sub-compartment 816. For example, as mentioned above, the sub-compartment 816 includes fire suppressant such as foam glass 826. In these or other embodiments, the irregularly shaped components of the detailed view 824 comprise the foam glass 826. Further, in one or more implementations, the sub-compartment 816 also includes the silica gel 818. For example, as shown in the detailed view 824, the silica gel 818 is shown as spherical beads. In some embodiments, the sub-compartment 816 further includes water 828 mixed with the foam glass 826 and the silica gel 818 as described above. For instance, as shown in the detailed view 824, the water 828 fills the space, at least in part, between the individual pieces of the foam glass 826 and the silica gel 818.

Further, in some embodiments, the fire suppressant pillows include a gas permeable shroud. In these or other embodiments, the shroud of the fire suppressant pillows (e.g., the shroud of the top fire suppressant pillow 811) allows gases produced during a thermal event to pass through the shroud for filtering by the fire suppressant of the fire suppressant pillows. For example, in some implementations, the fire suppressant of the fire suppressant pillows has gas filtering properties. Indeed, as illustrated in FIG. 8, the gases (illustrated by the solid arrows) can pass through the shroud of the top fire suppressant pillow 811 and/or the fire suppressant 502 (e.g., when the fire suppressant 502 includes a fire suppressant pillow).

As further illustrated in FIG. 8, in one or more embodiments, the battery collection and fire suppression system 100 can include additional fire suppressant 502 within the inner cavity of the battery collection bin 102. Specifically, the battery collection and fire suppression system 100 includes the additional fire suppressant 502 positioned about the e-bike insert 202B. Indeed, in one or more implementations, the battery collection and fire suppression system 100 includes the additional fire suppressant positioned between the inner walls 804 and the e-bike insert 202B as shown. Additionally, or alternatively, in some embodiments, the battery collection and fire suppression system 100 also includes the fire suppressant 502 between the sleeves of the e-bike insert 202B.

In some implementations, the battery collection and fire suppression system 100 can include the fire suppressant 502 within the inner cavity of the battery collection bin 102 positioned about the modular inserts (e.g., the e-bike insert 202B) and/or the sleeves of the modular inserts as loose fire suppressant, fire suppressant pillows, or a combination thereof. In embodiments of the battery collection and fire suppression system 100 including the additional fire suppressant 502 as one or more fire suppressant pillows, the fire suppressant pillows can include a shroud and fire suppressant enclosed within the shroud. In these or other embodiments, the shroud selectively melts or burns during a thermal event and automatically deploys the fire suppressant from within the fire suppressant pillows into the inner cavity to suppress the thermal event.

To illustrate, the shroud of the additional fire suppressant 502 can selectively burn in areas affected by the heat and flames of the thermal event. Moreover, in one or more embodiments, the battery collection and fire suppression system 100 can then automatically deploy the fire suppressant within the fire suppressant pillows through the selectively melted or burned portion of the shroud into the inner cavity as illustrated by the dashed arrows leaving the additional fire suppressant 502. Specifically, in these or other embodiments, the battery collection and fire suppression system 100 deploys the additional fire suppressant 502 onto the batteries 822 undergoing the thermal event in the e-bike insert 202B. Furthermore, in one or more implementations, the additional fire suppressant 502 includes fire suppressant pillows between the sleeves of the e-bike insert 202B which also automatically deploy the additional fire suppressant onto the batteries 822 undergoing the thermal event. Alternatively, in some embodiments, the portions of the shroud of the fire suppressant pillows making up the additional fire suppressant 502 not affected by the heat and flames of the thermal event remain intact. In these or other embodiments, the intact portion of the shroud retains a portion of the fire suppressant and/or prevents the fire suppressant from being deployed onto the battery 820 not undergoing the thermal event.

Through the focused deployment of fire suppressant described in the foregoing paragraphs, the battery collection and fire suppression system 100 facilitates ease of battery collection, storage, and transportation. For example, by focusing the deployment of the fire suppressant above or adjacent to a battery undergoing a thermal event, the battery collection and fire suppression system 100 ensures that the deployed fire suppressant 502 falls into the sleeve or modular inserts containing the battery undergoing the thermal event. In contrast to the melted or burned shroud in the focused area above the sleeve or unit of the modular inserts 202A-D containing the battery undergoing a thermal event, the rest of the shroud remains intact. Therefore, the intact portion of the shroud retains the remaining undeployed fire suppressant 502. When storage and/or transportation of the batteries is complete, a user can easily remove the top fire suppressant pillow 811 containing the rest of the fire suppressant 502 for easy access to the intact batteries.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A battery collection and fire suppression system comprising:

a battery collection bin comprising an inner cavity and a lid configured to selectively provide access to the inner cavity;

at least one modular insert configured to be inserted and held in place within the inner cavity of the battery collection bin, the at least one modular insert being sized and configured to hold one or more batteries, wherein the at least one modular insert comprises one or more side openings in a side of the at least one modular insert, the one or more side openings being configured to:

direct heat and flames of a battery therein undergoing a thermal event away from the battery; or direct a fire suppressant material within the inner cavity of the battery collection bin into the at least one modular insert; and one or more fire suppressant pillows positioned above the inner cavity of the battery collection bin, the one or more fire suppressant pillows being configured to automatically deploy fire suppressant into the inner cavity during the thermal event.

2. The battery collection and fire suppression system of claim 1, wherein the battery collection bin further comprises:

an outer wall comprising one or more outer wall vents in the outer wall;

an inner wall defining the inner cavity and comprising one or more inner wall vents in the inner wall; and an inter-wall void between the outer wall and the inner wall configured to hold a filtering material within the inter-wall void;

wherein the filtering material is configured to filter gases passing from the one or more inner wall vents to the one or more outer wall vents.

3. The battery collection and fire suppression system of claim 2, wherein the battery collection bin further comprises one or more gas deflectors extending from at least one of the inner wall or the outer wall into the inter-wall void below the one or more inner wall vents and the one or more outer wall vents such that the one or more gas deflectors direct the gases passing from the one or more inner wall vents to the one or more outer wall vents through the filtering material in the inter-wall void.

4. The battery collection and fire suppression system of claim 1, wherein the at least one modular insert comprises a plurality of sleeves, wherein each sleeve of the plurality of sleeves:

is sized and configured to hold at least one of the one or more batteries; and is spaced away from adjacent sleeves of the plurality of sleeves to prevent the heat and the flames of the battery therein undergoing the thermal event from spreading to the adjacent sleeves.

5. The battery collection and fire suppression system of claim 4, wherein each sleeve of the plurality of sleeves comprises a top opening configured to direct the heat and the flames of the battery therein undergoing the thermal event toward the one or more fire suppressant pillows positioned above the inner cavity of the battery collection bin.

6. The battery collection and fire suppression system of claim 1, wherein the one or more side openings are angled downwardly and inwardly toward an interior of the at least one modular insert to facilitate movement of the fire suppressant material into the at least one modular insert.

7. The battery collection and fire suppression system of claim 1, wherein the fire suppressant comprises a foam glass and a charged silica gel.

8. A battery collection and fire suppression system comprising:

a battery collection bin comprising an outer wall, an inner wall defining an inner cavity, and an inter-wall void between the outer wall and the inner wall;

at least one modular insert configured to be inserted and held in place within the inner cavity of the battery collection bin, the at least one modular insert being sized and configured to hold one or more batteries;

one or more outer wall vents in the outer wall;

one or more inner wall vents in the inner wall; and a filtering material within the inter-wall void;

wherein the one or more outer wall vents are offset from the one or more inner wall vents such that gases passing from the one or more inner wall vents to the one or more outer wall vents must pass through the filtering material within the inter-wall void.

9. The battery collection and fire suppression system of claim 8, wherein the battery collection bin further comprises one or more gas deflectors extending from the inner wall into the filtering material within the inter-wall void below the one or more inner wall vents such that the one or more gas deflectors direct the gases passing from the one or more inner wall vents to the one or more outer wall vents downward into the filtering material below the one or more inner wall vents.

10. The battery collection and fire suppression system of claim 8, wherein the at least one modular insert is positioned within the inner cavity of the battery collection bin to prevent heat or flames of a battery therein undergoing a thermal event from spreading to adjacent modular inserts within the inner cavity of the battery collection bin.

11. The battery collection and fire suppression system of claim 8, wherein the at least one modular insert comprises a plurality of sleeves, wherein each sleeve of the plurality of sleeves:

is sized and configured to hold at least one of the one or more batteries; and comprises a top opening configured to direct heat or flames of a battery therein undergoing a thermal event from spreading to adjacent sleeves by directing the heat or the flames upward toward one or more fire suppressant pillows positioned above the inner cavity of the battery collection bin.

12. The battery collection and fire suppression system of claim 8, further comprising one or more fire suppressant pillows positioned above the inner cavity of the battery collection bin, the one or more fire suppressant pillows being configured to automatically deploy fire suppressant to a targeted location of a thermal event within the inner cavity.

13. The battery collection and fire suppression system of claim 12, wherein the one or more fire suppressant pillows comprise the fire suppressant enclosed within a shroud, the shroud being configured to selectively melt or burn above a battery undergoing the thermal event to deploy the fire suppressant to the targeted location of the thermal event.

14. The battery collection and fire suppression system of claim 8, further comprising additional fire suppressant within the inner cavity of the battery collection bin positioned about the at least one modular insert such that the additional fire suppressant automatically deploys into the at least one modular insert in response to a thermal event.

15. A battery collection and fire suppression system comprising:

a battery collection bin comprising an inner cavity and a lid configured to selectively provide access to the inner cavity;

at least one modular insert configured to be inserted and held in place within the inner cavity of the battery collection bin, wherein the at least one modular insert comprises a plurality of sleeves, wherein each sleeve of the plurality of sleeves:

is sized and configured to hold one or more batteries; and is configured to prevent heat and flames of a battery therein undergoing a thermal event from spreading to adjacent sleeves of the plurality of sleeves; and fire suppressant within the inner cavity of the battery collection bin positioned about the plurality of sleeves, wherein the fire suppressant within the inner cavity of the battery collection bin positioned about the plurality of sleeves comprises one or more fire suppressant pillows, the one or more fire suppressant pillows comprising:

a shroud; and the fire suppressant enclosed within the shroud;

wherein the shroud is configured to:

selectively melt or burn during the thermal event; and automatically deploy the fire suppressant from within the one or more fire suppressant pillows into the inner cavity to suppress the thermal event.

16. The battery collection and fire suppression system of claim 15, wherein the battery collection bin further comprises:

an outer wall comprising one or more outer wall vents in the outer wall;

an inner wall defining the inner cavity, the inner wall comprising one or more inner wall vents in the inner wall; and an inter-wall void between the outer wall and the inner wall configured to hold a filtering material within the inter-wall void;

wherein the one or more inner wall vents and the one or more outer wall vents are configured to vent gases produced during the thermal event from the inner cavity through the filtering material within the inter-wall void.

17. The battery collection and fire suppression system of claim 16, wherein the battery collection bin further comprises one or more gas deflectors attached to the battery collection bin within the inter-wall void and extending below the one or more inner wall vents wherein the one or more gas deflectors are configured to direct gas produced during the thermal event through the filtering material within the inter-wall void.

18. The battery collection and fire suppression system of claim 15, wherein the battery collection bin is configured to hold the at least one modular insert spaced away from adjacent modular inserts within the inner cavity of the battery collection bin to prevent the heat and the flames of the battery undergoing the thermal event from spreading across the at least one modular insert and the adjacent modular inserts.

19. The battery collection and fire suppression system of claim 15, wherein the shroud is gas permeable such that gases produced during the thermal event pass through the shroud for filtering by the fire suppressant enclosed within the shroud.

20. The battery collection and fire suppression system of claim 15, wherein the one or more fire suppressant pillows are positioned between the inner cavity and the lid of the battery collection bin, the one or more fire suppressant pillows being configured to automatically deploy the fire suppressant targeted at the battery undergoing the thermal event.

* * * * *